United States Patent
Constantinescu et al.

(10) Patent No.: US 9,195,673 B2
(45) Date of Patent: Nov. 24, 2015

(54) SCALABLE GRAPH MODELING OF METADATA FOR DEDUPLICATED STORAGE SYSTEMS

(71) Applicant: International Business Machines Corporation, Armonk, NY (US)

(72) Inventors: Mihail Corneliu Constantinescu, San Jose, CA (US); Abdullah Gharaibeh, Vancouver (CA); Maohua Lu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 13/832,043

(22) Filed: Mar. 15, 2013

(65) Prior Publication Data
US 2014/0279927 A1 Sep. 18, 2014

(51) Int. Cl.
*G06F 17/30* (2006.01)

(52) U.S. Cl.
CPC .... *G06F 17/30156* (2013.01); *G06F 17/30162* (2013.01); *G06F 17/30312* (2013.01)

(58) Field of Classification Search
CPC ............ G06F 17/30147; G06F 17/30156; G06F 17/30162; G06F 17/30312
See application file for complete search history.

(56) References Cited

U.S. PATENT DOCUMENTS

| | | | |
|---|---|---|---|
| 7,143,091 B2 * | 11/2006 | Charnock et al. | 1/1 |
| 7,992,037 B2 * | 8/2011 | Dubnicki et al. | 714/6.2 |
| 8,299,944 B2 * | 10/2012 | Provenzano | 341/50 |
| 8,316,064 B2 * | 11/2012 | Hsu | 707/813 |
| 8,463,742 B1 * | 6/2013 | Floyd et al. | 707/609 |
| 8,700,578 B1 * | 4/2014 | Varadan et al. | 707/692 |
| 8,719,234 B2 * | 5/2014 | Akirav et al. | 707/692 |
| 8,843,489 B2 * | 9/2014 | Provenzano | 707/737 |
| 2009/0327625 A1 * | 12/2009 | Jaquette et al. | 711/160 |
| 2010/0018499 A1 * | 1/2010 | Odell | 123/345 |
| 2010/0049735 A1 * | 2/2010 | Hsu | 707/103 R |
| 2010/0064166 A1 * | 3/2010 | Dubnicki et al. | 714/4 |
| 2010/0070698 A1 * | 3/2010 | Ungureanu et al. | 711/108 |
| 2010/0082700 A1 * | 4/2010 | Parab | 707/803 |
| 2010/0088349 A1 * | 4/2010 | Parab | 707/802 |
| 2010/0250501 A1 * | 9/2010 | Mandagere et al. | 707/692 |
| 2010/0318499 A1 | 12/2010 | Arasu et al. | |
| 2012/0109907 A1 * | 5/2012 | Mandagere et al. | 707/692 |

(Continued)

OTHER PUBLICATIONS

IBM, "A resource management mode for distributed storage systems", publication date: Apr. 17, 2006, 4 pages.

(Continued)

*Primary Examiner* — Jean M Corrielus
(74) *Attorney, Agent, or Firm* — Cantor Colburn LLP; Bryan Butler

(57) ABSTRACT

Embodiments of the invention relate to a method and computer program product for providing a scalable representation of metadata for deduplicated storage systems. The method includes identifying shared data segments that are contained in a plurality of data objects in a deduplicated storage system. A data object centric graph is generated. The generating includes creating vertices that represent the data objects and creating edges between the data objects. An edge connecting two data objects indicates that the two data objects contain at least one shared data segment in common. Each shared data segment between any two data objects is represented by at most one of the edges. At least one of the data objects is manipulated based on the data object centric graph.

16 Claims, 5 Drawing Sheets

(56) References Cited

U.S. PATENT DOCUMENTS

| | | | |
|---|---|---|---|
| 2012/0124012 A1* | 5/2012 | Provenzano et al. | 707/692 |
| 2012/0124013 A1* | 5/2012 | Provenzano | 707/692 |
| 2012/0124046 A1* | 5/2012 | Provenzano | 707/737 |
| 2012/0124105 A1* | 5/2012 | Provenzano | 707/813 |
| 2013/0036104 A1* | 2/2013 | Hsu | 707/698 |
| 2014/0006363 A1* | 1/2014 | Constantinescu et al. | 707/692 |

OTHER PUBLICATIONS

Postel, Jonathan Bruce et al., "A Graph Model Analysis of Computer Communications Protocols", publication date Jan. 31, 1974, 195 pages.

* cited by examiner

| File ID | Chunk IDs | File Size |
|---|---|---|
| 1 | H A B C G | 20 |
| 2 | J A B C | 16 |
| 3 | K A B C | 16 |
| 4 | L A B C | 16 |
| 5 | M A B C F | 20 |
| 6 | W D E G | 16 |
| 7 | P D E | 12 |
| 8 | Q D E | 12 |
| 9 | R D E F | 20 |

402

404

406

SCALABLE GRAPH MODELING OF METADATA FOR DEDUPLICATED STORAGE SYSTEMS

BACKGROUND

The present invention relates generally to storage systems and, more specifically, to scalable graph modeling of metadata for deduplicated storage systems.

Digitization of large volumes of data and an increase in the richness of content of data have led to high demands for data storage capacity. One way to counter this increasing need for data storage capacity is to add additional hardware resources. However, in the storage domain, the addition of more storage often results in a disproportionate increase in the total cost of ownership (TCO). Though the cost of acquisition has retreated as a result of reductions in hardware costs, the cost of management (e.g., administration, power/energy) has increased. Many companies are attempting to provide a better solution by using data footprint reduction techniques such as deduplication.

Data deduplication removes or minimizes the amount of redundant data in a storage system by keeping only unique instances of the data on storage. Redundant data is replaced with a pointer to the unique data copy. By reducing space requirements, deduplication reduces the need for new storage resources. Implementations of deduplication often lead to substantial savings, both in terms of new resource acquisition costs and management costs, thereby leading to a significant reduction in TCO. In backup environments, deduplication also lowers the network bandwidth requirements for remote backups, replication and disaster recovery by reducing the amount of transmitted data on the network.

The use of deduplication introduces challenges to storage management as storage objects (e.g., files) are no longer independent from each other due to content sharing between storage objects. When storage objects share content with each other, they cannot be managed independently because a management decision on one file may affect another file. For example, in a traditional tiered storage system, individual "old" files can be migrated to a "colder" tier (e.g., from disks to tapes) without affecting other files. However, in a deduplicated tiered storage system, old files may share content with other files that are not necessarily old, so the migration of a candidate file needs to consider other files that share content with the candidate file, which complicates the storage management tasks.

Understanding the sharing relationships between data objects in a deduplicated storage system is important in order to provide efficient data management, such as data placement and data retrieval.

BRIEF SUMMARY

An embodiment includes a method, computer program product, and system for providing a scalable representation of metadata for deduplicated storage systems. The method includes identifying shared data segments that are contained in a plurality of data objects in a deduplicated storage system. A data object centric graph is generated. The generating includes creating vertices that represent the data objects and creating edges between the data objects. An edge connecting two data objects indicates that the two data objects contain at least one shared data segment in common. Each shared data segment between any two of the data objects is represented by at most one of the edges. At least one of the data objects is manipulated based on the data object centric graph.

Another embodiment includes a method for providing scalable representation of metadata for deduplicated storage systems. The method includes identifying shared data segments that are contained in a plurality of data objects in a deduplicated storage system. A data segment centric bipartite graph is generated. The generating includes creating vertices that represent the data objects and the shared data segments, and creating edges between the data objects and the shared data segments. An edge between a data object and a shared data segment indicates that the data object contains the shared data segment. At least one of the data objects is manipulated based on the data segment centric bipartite graph.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments described herein are directed to scalable graph modeling of metadata for deduplicated storage systems. The graph structures described herein illustrate content sharing between data objects (e.g., files) in deduplicated storage systems. Metadata that exposes sharing relationships between data objects is modeled in a deduplicated storage system as a graph in order to leverage the expressive power of graph representation yet with a reduced metadata size. Contemporary solutions rely on a single hash table that is keyed by hash values to indirectly expose sharing between data objects. This requires storage users to read through all hash values of a group of data objects each time they require a panorama of sharing among the group of data objects. This process is often time consuming and not scalable. In contrast to contemporary solutions, embodiments described herein build up a graph initially from the hash table, and then update the graph incrementally later on so that the storage users do not need to rebuild the representation from scratch again and again. Furthermore, the size of the graph representation can be reduced significantly if storage users require visibility to only high level sharing information (e.g., the number of shared bytes) among data objects.

Embodiments described herein identify two main ways to model data sharing as a graph: data segment centric and data object centric. As used herein, the term "data object" refers to, but is not limited to: a file, a group of files, a block, a group of blocks, a volume, a group of volumes, all or a portion of the storage for a particular computer, or a user defined data structure. Data objects are made up of one or more fixed or variable sized data segments. As used herein, the term "data segment" refers to, but is not limited to: a specified number of bytes, a block of bytes, a group of blocks, a segment containing more than one consecutive data segments (created, for example, by aggregating consecutive shared data segments), or a user defined grouping. As used herein, the term "shared data segment" refers to a data segment that is contained in two or more data objects.

Figure 1:
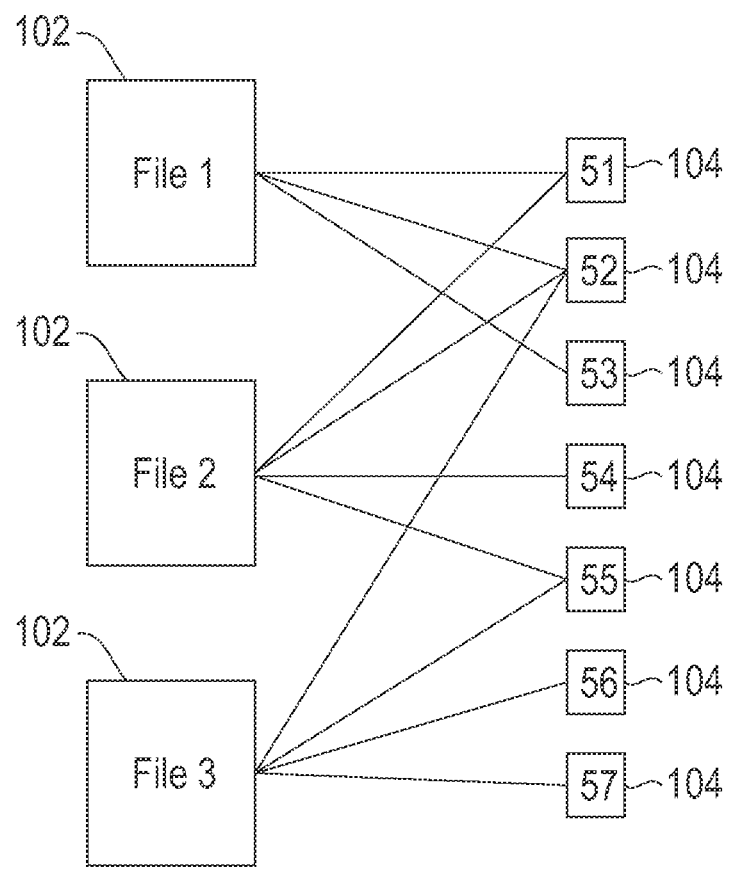
FIG. 1 illustrates a data segment centric graph that models the sharing of data segments between data objects in a storage system in accordance with an embodiment.

Referring now to FIG. 1, a data segment centric graph that models the sharing of data segments between data objects in a storage system in accordance with an embodiment is generally shown. The data segment centric graph represents both data segments 104 and data objects 102 as vertices. In FIG. 1, the data segments 104 are denoted as "S1", "S2", "S3", "S4", "S5", "S6", and "S7", and the data objects 102 are denoted as "FILE 1", "FILE 2", and "FILE 3". As shown in FIG. 1, edges exist between data objects 102 and data segments 104 only (and not between data objects 102). Thus, the graph shown in FIG. 1 is a bipartite graph of the set of data objects 102 and the set of data segments 104. An edge exists between a data object 102 and a data segment 104 when the data segment 104 exists in the data object 102. As shown in the graph of FIG. 1: data segments S1, S2 and S3 are contained in FILE 1; data segments S1, S3, S4, and S5 are contained in FILE 2; and data segments S2, S5, S6, and S7 are contained in FILE 3. In an embodiment, the data segment centric graph also includes edge weights which are used to specify data segment offsets, where a data segment offset indicates the offset at which the data segment appears in the data object the edge connects to. The data segment centric graph shown in FIG. 1 includes detailed, data segment level, sharing information that may be used to aid in data placement or other data object manipulations.

There are many use cases where the incremental update of the graph is desired. For example, for online deduplication of active data, it is desirable to maintain an up-to-date deduplication graph to provide advisory information to improve deduplication performance (for example, by providing locality information of duplicate data segments). The data segment centric graph bipartite graph shown in FIG. 1 can be updated incrementally when the content of one or more data objects 102 is updated. When one data segment 104 changes, only the data objects 102 connected to it in the bipartite graph need to be updated.

Note that shared data segments 104 shown in FIG. 1 have spatial locality, so that instead of representing data segments 104 individually, a repetitive sequence of shared data segments 104 can be represented as a vertex in the bipartite graph, thus having the potential to reduce the size of the bipartite graph.

Figure 2:
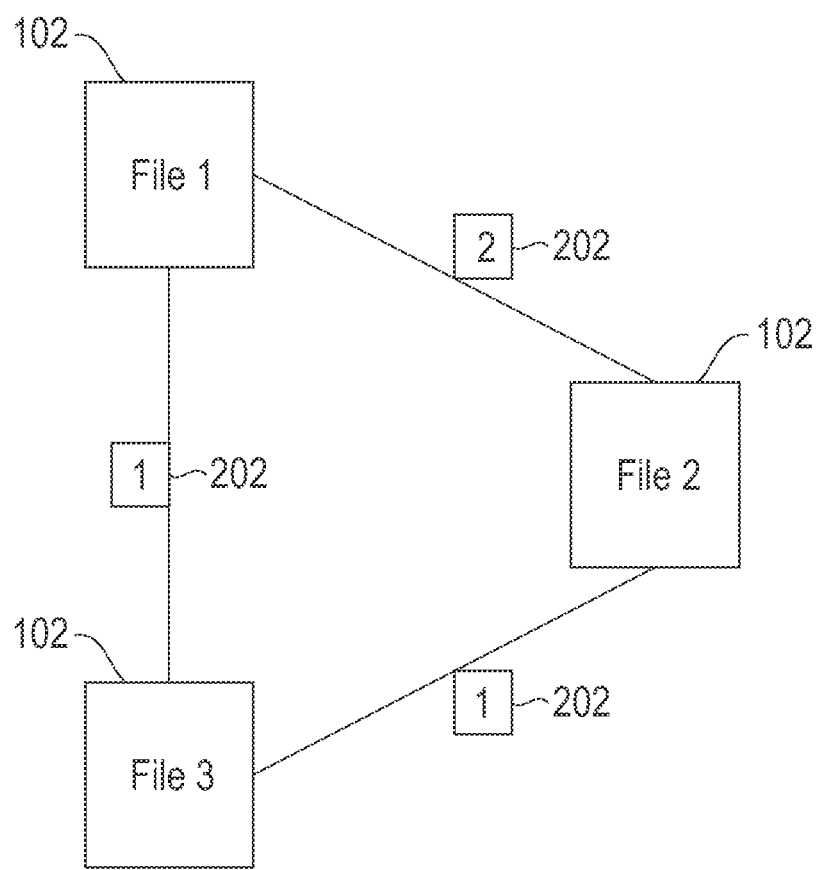
FIG. 2 illustrates a data object centric graph that models the sharing of data segments between data objects in a storage system in accordance with an embodiment.

Referring now to FIG. 2, a data object centric graph that models the sharing of data segments between data objects in a storage system is illustrated in accordance with an embodiment. The data object centric graph shown in FIG. 2 has a lower memory footprint than the data segment centric graph shown in FIG. 1. The data object centric graph shown in FIG. 2 represents only data objects 102 as vertices. Edges are placed between data objects 102 that share data segments 104. In an embodiment, edge weights 202 represent the amount of sharing. For example, an edge weight 202 value of "2" between the data object 102 labeled "FILE 1" and the data object 102 labeled "FILE 2" means that "FILE 1" and "FILE 2" share two data segments 104. The data object centric graph summarizes the detailed information offered by the data segment centric model of FIG. 1 by indicating the amount of sharing between data objects 102. As shown in FIG. 2, the amount of sharing between data objects 102 is described by the graph and there is no visibility to the specific data segments 104 that are shared. Removing the detailed information results in a relatively small graph that is proportional in size to the order of the number of data objects 102, which is typically orders of magnitude lower than the number of data segments.

For a data object centric graph, such as that shown in FIG. 2, the vertices are connected with a minimal set of edges in the following sense. For example, if "n" data objects 102 share a data segment 104, then the number of edges between this set of data objects 102 is "n−1." Thus, each shared data segment 104 between any two of the data objects 102 is represented by at most one of the edges. The idea is to not have duplicate edges that model the sharing of the same content between data objects 102. This enables an important property of embodiments of data object centric graph models described herein: the ability to estimate, as an upper bound, the deduplicated size of a set of data objects 102 through a simple graph traversal. In particular, the deduplicated size can be computed by a breadth-first search (BFS) traversal that sums the weights of the vertices (which represent data objects sizes) and subtracts the edge weights 202 (which represent the size of the duplicates). It is noted that for a non-partitioned graph component this is not an approximation but always produces the correct result. In other words, the deduplicated size of the set of data objects 102 is simply the sum of the vertex sizes minus the sum of the connecting edge weights.

In an embodiment of the data object centric graph, identical data objects (e.g., full file duplicates) are represented only once and singleton data objects (e.g., files that do not share any data segments with other files) are not represented in the graph.

An important practical aspect of embodiments is the building of the data object centric graphs, particularly identifying the edges, which represent sharing dependencies, between vertices (i.e., data objects). The process takes as input deduplication metadata, particularly a data object segment map which identifies the list of data segments 104 that each data object 102 is composed of. As output, embodiments produce a graph represented as a list of edges, called an edge list. One important requirement for building the graph is scalability, the graph should scale to handle petabyte scale systems. Therefore, scalability limiting constraints (such as requiring a large memory footprint) should be avoided.

Figure 3:
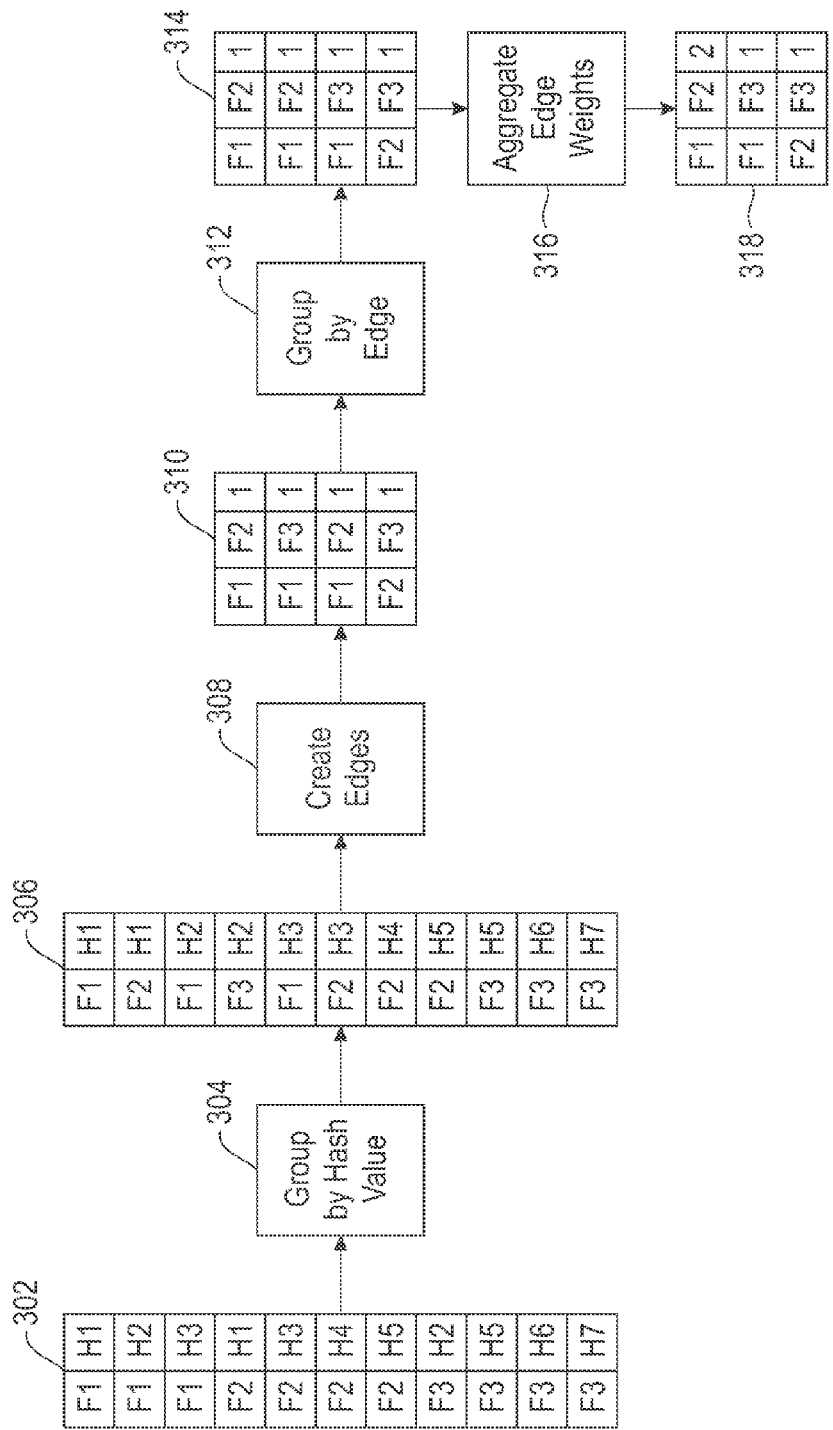
FIG. 3 illustrates a process for creating the data segment centric graph shown in FIG. 1 and the data object centric graph shown in FIG. 2 in accordance with an embodiment.

Turning now to FIG. 3, a process for creating the data segment centric graph shown in FIG. 1 and the data object centric graph shown in FIG. 2 in accordance with an embodiment is generally shown. Block 302 is an embodiment of metadata stored in a database that maps data segments to data objects. As shown in block 302, the hash values (denoted as "H1", "H2", "H3", "H4", "H5", "H6", and "H7") of data segments 104 are mapped to data objects 102 (denoted as "F1", "F2", and "F3"). H1 is the result when a hash operation is performed on the data segment 104 labeled "S1", H2 is the result when the hash operation is performed on the data segment 104 labeled "S2", and so on such that hash(S#)=H#. The data shown in block 302 is referred to herein as a "data object to data segment map" and it may be used to generate the pair of data object and data segment.

At block 304, the data object to data segment map in block 302 is sorted based on hash values. The processing at block 304 groups together data objects 102 that share a common data segment 104. In an embodiment, this is performed by sorting the data object to data segment map shown in block 302 by hash value. Several efficient and scalable disk-based sorting algorithms which do not demand a large memory footprint exist and may be utilized by embodiments, including, but not limited to: an ORDER BY SQL clause and a Linux® sorting tool. The hash value sorted data object to data segment map output from block 304 is shown in block 306. The contents of block 306 may be left in table form as shown in block 306 and/or the data in block 306 may be used to depict a graph such as that shown in FIG. 1.

At block 308, edges are created between data objects 102 that share a data segment 104 using the hash value sorted data object/data segment map in block 306 as input. In an embodiment, at block 308, a simple scan is performed over the hash value sorted data object to data segment map in block 306 and the edges as shown in block 310 are created. For the sparse data object centric graph representation shown in FIG. 2, any graph heuristic that satisfies a minimal set of edges requirement may be used by embodiments. Creating the edges at block 308 may produce more than one edge between any two vertices (e.g., when two data objects 102 sharing two different chunks 104). The processing at blocks 312 and 316 are performed to aggregate multiple edges between the same pair of nodes into 1 edge.

At block 312, the edges shown in block 310 are received and grouped by edge to generate the ordered edge list shown in block 314. In an embodiment, this is performed by a sorting method, such as one or more of those described above with respect to block 304. At block 316, the edge weights 202 are aggregated to generate the data shown in block 318. In an embodiment, at block 316, a sum reduction is performed over the weights of similar edges via a single scan over the ordered edge list shown in block 314. The resulting minimal edge data object centric graph may be left in table form as shown in block 318 and/or the data in block 318 may be used to depict a graph such as that shown in FIG. 2.

Embodiments of the graph generation process described herein do not require excessive memory requirements. The performance of the two major operations, hash and edge grouping, can benefit from additional physical memory, but can still be processed efficiently on disk.

Graphs are well known for their expressive power and this can be leveraged by encoding sharing constraints among data objects 102. For example, if two data objects 102 are supposed to be separated into two deduplication domains, these two vertices can be tagged as having different colors so that subsequent algorithms partitioning the graph can take into account this sharing constraints. More complicated sharing can also be applied to embodiments of the graphs. Any sharing constraint can be modeled as long as the constraint can be expressed by vertices and edges of the graph.

In embodiments of the data object centric graph, a star graph heuristic is used where one of the data objects 102 is linked with every other data object 102. In other embodiments, a chain graph heuristic is used where the data objects 102 are linked to each other in a linked list. For the star topology, the master node (representing a data object 102) is connected with "n−1" nodes, so it has a degree of "n−1", while the rest of the nodes (representing data objects 102) have a degree of 1. In the chain topology, on the other hand, the two end nodes have degrees of 1 while the intermediary nodes have degrees of 2, so the distribution of node degrees is more balanced. Note that between these two heuristics there are many other ways to link the "n" data objects 102 by a minimal set of edges.

Figure 4:
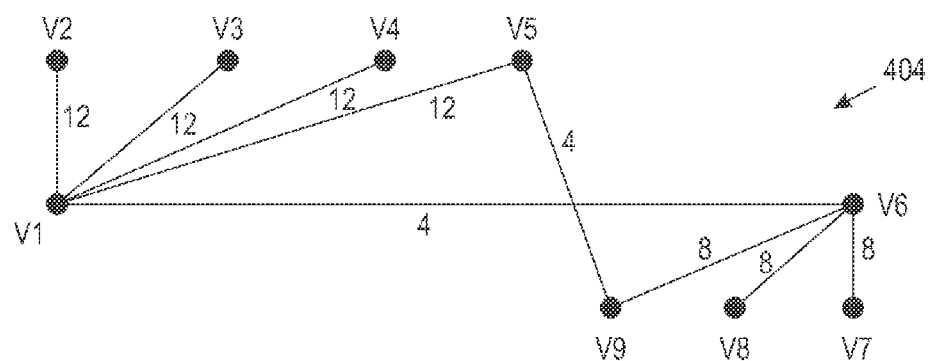
FIG. 4 illustrates exemplary star and chain data object centric graphs that may be implemented in accordance with an embodiments.
Figure 4:
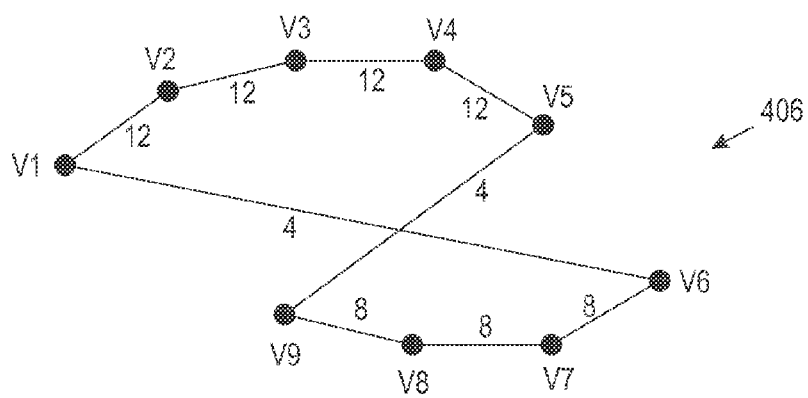

Turning now to FIG. 4, star and chain data object centric graphs that may be implemented in accordance with embodiments are generally shown. FIG. 4 shows a block diagram of a table 402 summarizing content of nine files in a small folder, a data object centric graph with star connectivity 404 built from the data in the table 402, and a data object centric graph with chain connectivity 406 built from the data in the table 402. The table 402 summarizes the content of the nine files, each file is made up of a sequence of data segments made up of four bytes. The first data segment is different for each file, but several data segments are common between files. The last column of the table 402 shows the size of each file in bytes, the total size of the nine files in the directory is 148 bytes.

In an embodiment, to determine content sharing, for example between files in a folder (or in an entire file system), trace data is collected by executing a file scanning program that traverses each file of the folder (or file system). In an embodiment, the trace contains, for each file, a sequence of SHA-1 cryptographic hash function content hashes, one hash for each data segment contained in the file. In this example, fixed data segments of 4 bytes are used, however in real applications the data segments sizes will be much larger (e.g., 4 kilobytes, 8 kilobytes, or more).

The star topology of the data object centric graph with star connectivity 404 includes a vertex for each file (v1, v2, v3 . . . v9) and edges represent sharing of content between vertices. To have a minimum number of edges in the graph, the shared content is represented only once. Representing the shared content only once provides the ability to determine the deduplicated size of the folder (or file system) as the sum of vertex sizes (raw file size) minus the sum of connecting edge weights. This topology is referred to as a star topology because for the "n" number of vertices sharing the same content, one is selected (i.e., the center of the star) to be connected with the other vertices. An alternative to the star topology is to use a chain topology as shown in the data object centric graph with chain connectivity 406 in FIG. 4.

Embodiments of the data segment and object centric graphs may be used to aid in determining data object groupings for backup and restore operations. For example, in the scenario where a deduplicated storage system is backed-up to a tape libraries, the graphs can be used to determine the specific tape a data segment should be placed on for optimal data object restore performance. Another scenario is informing data segment placement in deduplicated disk-based pools in large shared-nothing commodity server clusters, where servers have asymmetric access to disks, for optimal data object restore performance, or to reduce failure propagation on disk pools (if a disk fails, data loss does not spread to other disks)

In embodiments, the granularity of the data object is selected based on a granularity of a restore operation (also referred to herein as a "recovery operation") associated with the deduplicated storage system. For example, if the granularity of a restore operation is a file, then each data object can be a file; if the granularity of a restore operation is a volume, each data object can represent a volume.

Figure 5:
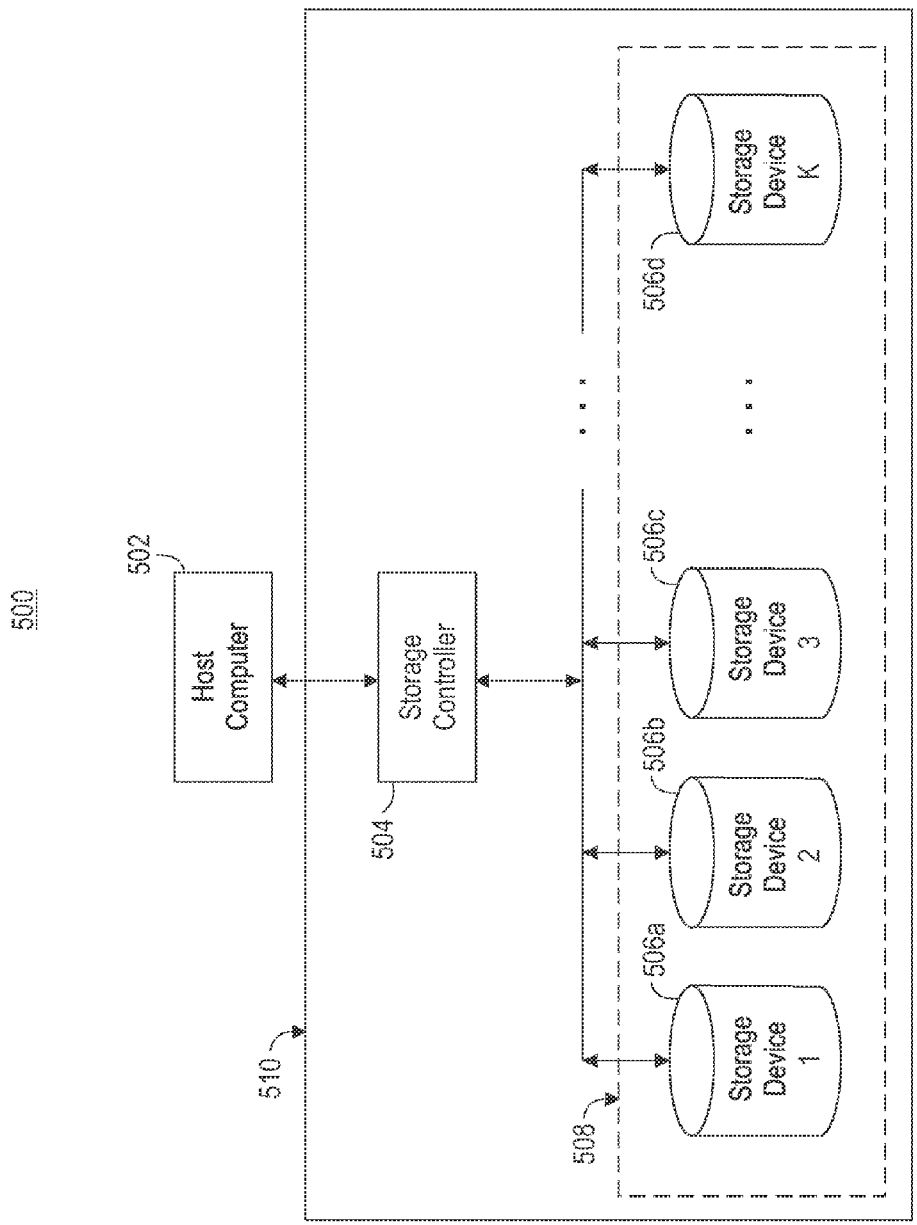
FIG. 5 illustrates a block diagram of a system for providing graph modeling of metadata for deduplicated storage systems in accordance with an embodiment.

Turning now to FIG. 5, a block diagram of a system for providing graph modeling of metadata for deduplicated storage systems in accordance with an embodiment is generally shown. As shown in FIG. 5, a host computer 502 is in communication with a storage controller 504 in a storage system 510. The storage system 510 stores data in a storage array made up of "K" storage devices 506 (where K is greater than one): storage device one 506*a*, storage device two 506*b*, storage device three 506*c*, through storage device K 506*d*. In an embodiment, data objects 102 and metadata about data segments 104 shared by the data objects 102 (i.e., the shared data segments) are stored on one or more of the storage devices 506. In an embodiment, the storage devices 506 in the storage array 508 are implemented by any storage devices known in the art such as, but not limited to: tapes/tape drives and/or disks/hard disk drives (HDDs). Though not shown in FIG. 5, one or both of the storage controller 504 and the host computer may contain memory devices to store data, such as all or a portion of the metadata, graphs and other data described herein. In addition, the storage system 510 and/or the host computer 502 may implement a tiered hierarchy of memory and storage that includes memory devices (containing memory and/or cached memory), disks and tape devices. As shown in FIG. 5, the storage controller 504 is part of the storage system 510; in another embodiment, the storage controller 504 is part of the host computer 502. As used herein, the term "processor" refers to one or more processors located in the host computer 502 and/or the storage controller 504.

Technical effects and benefits include providing a general graph based metadata layer that represents sharing between user defined data objects 102. Embodiments also provide a light weight, yet accurate, representation of sharing between data objects 102. The representation of sharing is elastic in that it can be updated incrementally when data object 102 contents change. In addition, embodiments provide a flexible data structure that can incorporate sharing constraints among data objects 102. In embodiments, the graph that represents sharing between data objects 102 is less than one percent of the size of a contemporary hash table representation of the metadata.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of providing a scalable representation of metadata for deduplicated storage systems, the method comprising:
    identifying shared data segments that are contained in a plurality of data objects in a deduplicated storage system;
    generating a data object centric graph, the generating comprising:
        creating vertices that represent the data objects;
        creating edges between the data objects, wherein an edge connecting two data objects indicates that the two data objects contain at least one shared data segment in common and each shared data segment between any two of the data objects is represented by at most one of the edges; and
        assigning an edge weight to the edges, each edge weight indicating a number of shared data segments in common between data objects connected by the edge;
    manipulating at least one of the data objects based on the data object centric graph, the manipulating including estimating at least one of a size of the data objects based on the data object centric graph and an upward bound of the size of the data objects based on the data object centric graph;
    receiving an update to a data object; and
    incrementally updating the data object centric graph to reflect the update.

2. The method of claim 1, further comprising storing at least a portion of the data object centric graph in a memory device.

3. The method of claim 1, wherein identifying the shared data segments includes comparing hash values of the shared data segments.

4. The method of claim 1, wherein the manipulating further includes at least one of a backup operation and a restore operation, and a granularity of the data objects is selected based on a granularity of the restore operation.

5. The method of claim 1, wherein a data object is one of an individual file, a file system, and a computer.

6. The method of claim 1, wherein the manipulating further includes a data placement operation.

7. A computer program product for providing a scalable representation of metadata for a deduplicated storage system, the computer program product comprising:
    a non-transitory computer readable storage medium having program code embodied therewith, the program code executable by a processor to:
    identify shared data segments that are contained in a plurality of data objects in a deduplicated storage system;
    generate a data object centric graph, the generating comprising:
        creating vertices that represent the data objects;
        creating edges between the data objects, wherein an edge connecting two data objects indicates that the two data objects contain at least one shared data segment in common and each shared data segment between any two of the data objects is represented by at most one of the edges; and
        assigning an edge weight to the edges, each edge weight indicating a number of shared data segments in common between data objects connected by the edge;
    manipulate at least one of the data objects based on the data object centric graph, the manipulating including estimating at least one of a size of the data objects based on the data object centric graph and an upward bound of the size of the data objects based on the data object centric graph;
    receiving an update to a data object; and
    incrementally updating the data object centric graph to reflect the update.

8. The computer program product of claim 7, wherein the generating further comprises assigning an edge weight to the edges, each edge weight indicating a number of shared data segments in common between data objects connected by the edge.

9. The computer program product of claim 7, wherein the manipulating includes estimating at least one of a size of the data objects based on the data object centric graph and an upward bound of the size of the data objects based on the data object centric graph.

10. A system for providing a scalable representation of metadata for deduplicated storage systems, the system comprising:
    a memory having computer readable computer instructions; and
    a processor for executing the computer readable instructions, the instructions including:

identifying shared data segments that are contained in a plurality of data objects in a deduplicated storage system;

generating a data object centric graph, the generating comprising:

creating vertices that represent the data objects;

creating edges between the data objects, wherein an edge connecting two data objects indicates that the two data objects contain at least one shared data segment in common and each shared data segment between any two of the data objects is represented by at most one of the edges; and assigning an edge weight to the edges, each edge weight indicating a number of shared data segments in common between data objects connected by the edge;

manipulating at least one of the data objects based on the data object centric graph, the manipulating including estimating at least one of a size of the data objects based on the data object centric graph and an upward bound of the size of the data objects based on the data object centric graph;

receiving an update to a data object; and incrementally updating the data object centric graph to reflect the update.

11. A method of providing a scalable representation of metadata for deduplicated storage systems, the method comprising:

identifying shared data segments that are contained in a plurality of data objects in a deduplicated storage system;

generating a data segment centric bipartite graph, the generating comprising:

creating vertices that represent the data objects and the shared data segments;

creating edges between the data objects and the shared data segments, wherein an edge between a data object and a shared data segment indicates that the data object contains the shared data segment; and aggregating consecutive shared data segments into one shared data segment;

manipulating at least one of the data objects based on the data segment centric bipartite graph;

receiving an update to a selected one of the shared data segments;

updating data objects that are connected to the selected shared data segment by one of the edges in the data segment centric bipartite graph in response to receiving the update.

12. The method of claim 11, further comprising storing at least a portion of the data segment centric bipartite graph in a memory device.

13. The method of claim 11, wherein identifying the shared data segments includes comparing hash values of the shared data segments.

14. The method of claim 11, wherein a granularity of the data object is selected based on a granularity of a restore operation associated with the deduplicated storage system.

15. The method of claim 11, wherein the manipulating includes determining a storage location for at least one of the data objects.

16. The method of claim 11, further comprising incrementally updating the data segment centric bipartite graph based on the manipulating.

\* \* \* \* \*